(12) United States Patent
Metzger

(10) Patent No.: US 6,409,437 B1
(45) Date of Patent: Jun. 25, 2002

(54) HOLE SAW CENTERING DEVICE

(76) Inventor: William Davis Metzger, 2315 Urban Rd., Jacksonville, FL (US) 32110

( * ) Notice: Subject to any disclaimer, the term of this patent is extended or adjusted under 35 U.S.C. 154(b) by 0 days.

(21) Appl. No.: 09/687,164

(22) Filed: Oct. 16, 2000

(51) Int. Cl.[7] .................................................. B23B 51/04
(52) U.S. Cl. .......................... 408/80; 408/201; 408/204
(58) Field of Search ............................... 408/79, 80, 81, 408/68, 95, 96, 97, 201, 204, 209, 206

(56) References Cited

U.S. PATENT DOCUMENTS

| | | | |
|---|---|---|---|
| 4,203,692 A | * | 5/1980 | Jensen ........................... 408/96 |
| 5,366,326 A | * | 11/1994 | Converse ................... 408/72 B |
| 5,743,682 A | * | 4/1998 | Chaney, Sr. .................. 408/79 |
| 5,904,454 A | * | 5/1999 | Washer ......................... 408/67 |
| 6,305,885 B1 | * | 10/2001 | Linthicum ................... 408/204 |

FOREIGN PATENT DOCUMENTS

JP       61-152309 A    *  7/1986

* cited by examiner

*Primary Examiner*—Daniel W. Howell
(74) *Attorney, Agent, or Firm*—Arthur G. Yeager

(57) ABSTRACT

A cone shaped hole saw centering device for locating a hole saw where a hole larger than the pilot bit of the hole saw already exists. The device is simple with no attachment or adjustment necessary. It would locate a hole saw on any size hole from the inside diameter of the hole saw to the outside diameter of the pilot bit with or without the pilot bit being used.

20 Claims, 1 Drawing Sheet

HOLE SAW CENTERING DEVICE

CROSS-REFERENCE TO RELATED APPLICATIONS

No known prior filed copending nonprovisional applications.

STATEMENT REGARDING FEDERALLY SPONSORED RESEARCH OR DEVELOPMENT

No federally sponsored research or development involved.

REFERENCE TO A MICROFICHE APPENDIX

Not appicable.

BACKGROUND OF THE INVENTION

A hole saw is a well known cylindrical saw with teeth on the forward edge to cut large diameter holes in various solid materials. They all use a pilot bit centered in the middle to anchor the hole saw as it begins cutting. An arbor is used to attach the hole saw to a portable electric drill for power.

When a hole larger than the pilot bit exists where the new hole is to be drilled, hole saws have a serious drawback. Without the pilot bit anchored in the material to be cut, the hole saw at best wanders about the surface marring it, and not drilling where desired. At worst, with wood and large diameter saws, it will catch on one edge and violently spin off the surface.

Various devices have been developed in the past to solve the above problems and enlarge a prexisting hole.

The hole saw centering device solves the problems with less complication and more versatility than the others.

In U.S. Pat. No. 3,630,632 to Holleman, U.S. Pat. No. 5,069,584 to Obermeier, and U.S. Pat. No. 5,074,722 to Cochran devices are disclosed that use various means other than a hole saw to enlarge the hole, making such devices much more complicated and costly.

In U.S. Pat. No. 5,743,682 to Chaney a cone is used to locate a larger hole saw, but it employs complicated means to offset the hole, is restricted in the size existing hole it may enlarge, and was designed specifically for door knobs as stated.

In U.S. Pat. No. 5,413,437 to Bristow a second arbor is used to locate a hole saw the same diameter as the existing hole, restricting the device to enlarging standard size holes and requiring the possession of the correct size hole saw for a guide.

In U.S. Pat. No. 5,820,315 to Collard, U.S. Pat. No. 5,366,326 to Converse, and U.S. Pat. No. 4,579,486 to Damico devices are disclosed that use cylinders to locate the larger hole saw on the existing hole. They require mechanical attachment to the larger hole saw, and or adjustment for size, and are restricted in the size hole they may locate.

BRIEF SUMMARY OF THE INVENTION

The hole saw centering device is an invention to locate a hole saw in a place where a hole larger than the pilot bit exists.

It consists of a cone to center the hole saw, a spring to tension the cone against the work piece, and a hardened steel insert threaded in the cone to locate the pilot bit in the cone without damaging it if the pilot bit is used. It also features a shoulder on the cone to locate the cone in the hole saw if the user wishes not to use the pilot bit for fear of damaging items installed behind the hole.

It will accomplish the above with no mechanical attachment or adjustment on any size hole from the interior diameter of the hole saw to the exterior diameter of the pilot bit.

BRIEF DESCRIPTION OF THE SEVERAL VIEWS OF THE DRAWING

FIG. I. A side view of the hole saw centering device located between the work piece to be drilled and the hole saw which would be attached to an electric drill.

DETAILED DESCRIPTION OF THE INVENTION

Figure 1:
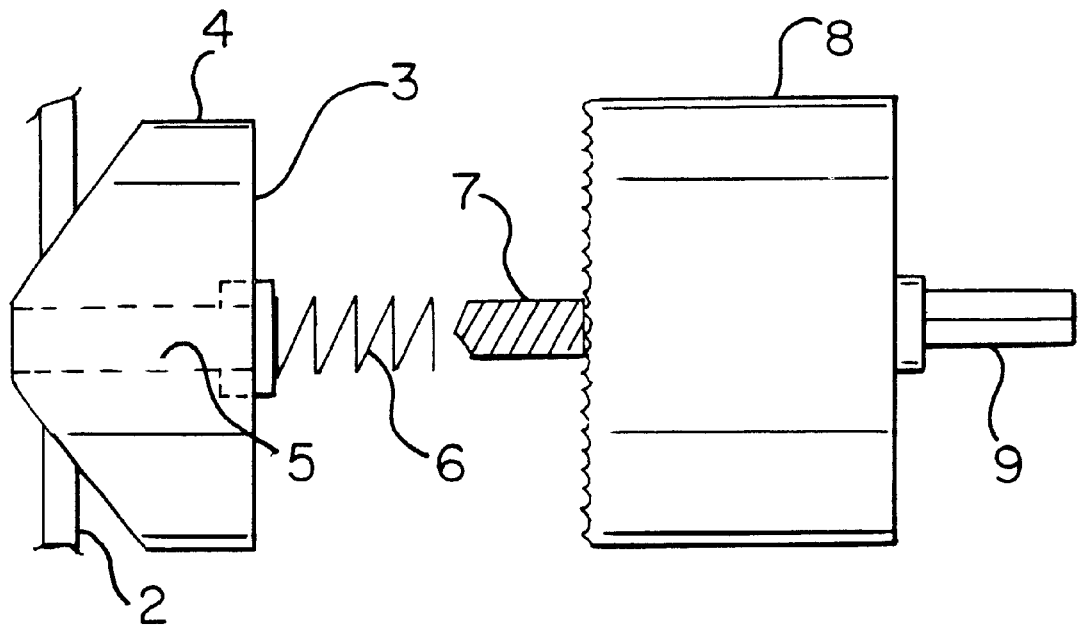
Figure 2:
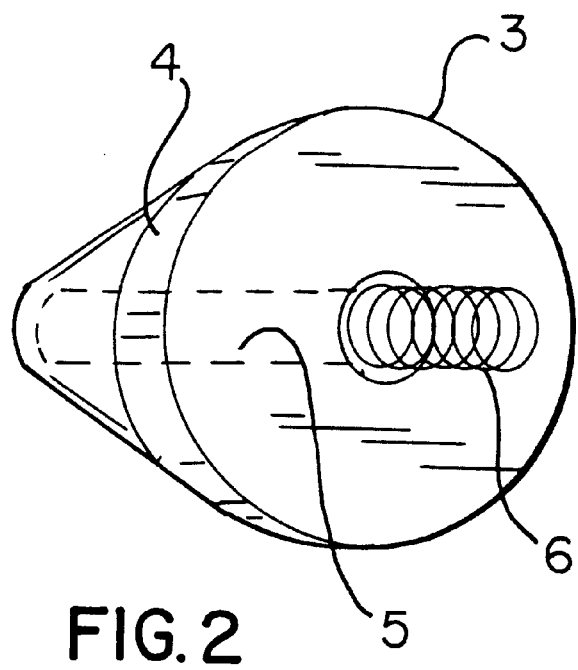
FIG. 2. A perspective view showing the conical nature of the invention.

The hole saw centering device consists of:

A solid cone 3 to be made from a suitable hard plastic or aluminum to locate a hole saw 8 in an existing hole larger than the pilot bit 7 of the hole saw 8 in a work piece 2.

A hardened steel insert 5 threaded into the center of the cone 3 to prevent damage to the cone 3 by the pilot bit 7.

A spring 6 welded to the insert 5 to tension the cone 3 against the work piece 2.

A shoulder 4 on the cone 3 to stabilize the cone 3 in the hole saw 8 in case the operator chooses not to use the pilot bit 7.

The arbor 9 would be inserted in an electric drill to power the assembly.

The distinguishing elements of the components are set forth herebelow.

The cone element 3 would be shallow enough to recess or retract within the cavity of the hole saw 8 enabling the cone element 3 to locate the hole saw 8 on any size hole on the work piece 2 from the inside diameter of the hole saw 8 to the outside diameter of the pilot bit 7.

The hardened steel insert 5 would allow the cone element 3 to be made from light, inexpensive plastic or aluminum without damage from the pilot bit 7. The fact that the insert 5 is threaded and the spring 6 welded to it would allow it to be easily removed and used with any size cone element 3 thereby saving parts and expense for different size cones 3.

The shoulder 4 on the cone element 3 fits within the cavity of the hole saw 8 and would further stabilize the hole saw 8 and allow it to be used without the pilot bit 7 if necessary. The shoulder 4 acts as a guide and stabilizer for the hole saw 8 while the hole saw 8 is being used to cut a larger hole in work piece 2 because the shoulder 4 is disposed closely adjacent the inner cylindrical wall forming the cavity of hole saw 8.

What I claim as my invention is:

1. A hole saw centering device for use in combination with a toothed edge cylindrical hole saw having a cavity therein defined by an internal cylindrical hole saw having a cavity therein defined by an internal cylindrical wall, said device comprising a cone element having a conical surface extending between its forward end and terminating at a cylindrical shoulder adjacent its rearward end, said shoulder having an external diameter comforming to and smaller than an internal diameter of a cylindrical hole saw to which said device is used so that said shoulder may guide and stabilize a cylindrical hole saw as it cuts into a work piece with said forward end disposed within a previously drilled hole in a work piece.

2. The device of claim 1 further comprising a hardened steel hollow insert extending substantially between said ends of said cone element with its hollow being substantially concentric with a central rotative axis of a cylindrical hole saw.

3. The device of claim 2 further comprising an elongate coil spring welded to said insert adjacent said rearward end of said cone.

4. The device of claim 3 wherein said coil spring has an internal passageway for allowing a central drill bit of a cylindrical hole saw to move therethrough.

5. The device of claim 1 wherein said cone element is solid.

6. The device of claim 5 wherein said cone element is of hard plastic material.

7. The device of claim 5 wherein said cone element is of aluminum material.

8. The device of claim 5 further comprising a hardened steel hollow insert extending substantially between said ends of said cone element with its hollow being substantially concentric with a central rotative axis of a cylindrical hole saw.

9. The device of claim 8 further comprising an elongate coil spring welded to said insert adjacent said rearward end of said cone.

10. The device of claim 9 wherein said coil spring has an internal passageway for allowing a central drill bit of a cylindrical hole saw to move therethrough.

11. The device of claim 5 wherein said insert is threadedly connected within said solid cone element.

12. The device of claim 1 wherein said cone element end portions are spaced a predetermined distance less than a length of a hole saw extending along its rotative axis so that said cone element may be fully retracted within a cavity of a hole saw.

13. The device of claim 12 wherein said cone element is solid.

14. The device of claim 13 further comprising a hardened steel hollow insert extending substantially between said ends of said cone element with its hollow being substantially concentric with a central rotative axis of a cylindrical hole saw.

15. The device of claim 14 further comprising an elongate coil spring welded to said insert adjacent said rearward end of said cone.

16. The device of claim 15 wherein said coil spring has an internal passageway for allowing a central drill bit of a cylindrical hole saw to move therethrough.

17. The device of claim 1 further comprising in combination a toothed edge cylindrical hole saw having a cavity therein defined by an internal cylindrical wall, said hole saw further including a toothed edge at a front end of said cylindrical wall and an arbor at a rear end of said cylindrical wall, said arbor being adapted to be connected to a power drill for rotating said hole saw about a central rotative axis of said cylindrical wall, said cone element including a hardened hollow insert extending substantially between said ends of said cone element and being secured thereto, said hollow being concentric with said central axis.

18. The device of claim 17 wherein said cone element end portions are spaced a predetermined distance less than a length of said hole saw between said ends of said cylindrical wall so that said cone element may be fully retracted within said cavity of said hole saw.

19. The device of claim 17 further comprising a drill bit extending forwardly of said toothed edge and being rotative with said hole saw, said drill bit being aligned with said central rotative axis and passing through said hollow to drill a pilot hole in a workpiece.

20. The device of claim 18 further comprising an elongated coil spring welded to said insert adjacent said rearward end of said cone element, said coil spring having an internal passageway for allowing said drill bit to move therethrough.

* * * * *